United States Patent
Qian et al.

(10) Patent No.: US 12,391,615 B1
(45) Date of Patent: Aug. 19, 2025

(54) SOLID POLYCARBOXYLATE SUPERPLASTICIZER AS WELL AS PREPARATION METHOD THEREFOR AND USE THEREOF

(71) Applicant: Anhui Conch Material Technology Co., Ltd., Wuhu (CN)

(72) Inventors: Shanshan Qian, Wuhu (CN); Feng Ding, Wuhu (CN); Feng Jin, Wuhu (CN); Feng Chen, Wuhu (CN); Jinying Peng, Wuhu (CN); Chang Zhao, Wuhu (CN)

(73) Assignee: ANHUI CONCH MATERIAL TECHNOLOGY CO., LTD., Wuhu (CN)

( * ) Notice: Subject to any disclaimer, the term of this patent is extended or adjusted under 35 U.S.C. 154(b) by 0 days.

(21) Appl. No.: 18/935,841

(22) Filed: Nov. 4, 2024

(30) Foreign Application Priority Data

Jun. 20, 2024 (CN) .......................... 202410795994.4

(51) Int. Cl.
*C04B 24/16* (2006.01)
*C08G 81/02* (2006.01)
*C04B 103/32* (2006.01)

(52) U.S. Cl.
CPC .......... *C04B 24/165* (2013.01); *C08G 81/025* (2013.01); *C04B 2103/32* (2013.01)

(58) Field of Classification Search
CPC .. C04B 24/165; C04B 2103/32; C08G 81/025
See application file for complete search history.

(56) References Cited

FOREIGN PATENT DOCUMENTS

| CN | 102173638 A | 9/2011 | |
| --- | --- | --- | --- |
| CN | 106749959 A | 5/2017 | |
| CN | 107739424 A | 2/2018 | |
| CN | 111533852 A | 8/2020 | |
| CN | 112079591 A | 12/2020 | |
| CN | 114380995 A | * 4/2022 | ......... C08G 73/0266 |
| CN | 114685799 A | 7/2022 | |
| CN | 115368517 A | 11/2022 | |
| CN | 115558062 A | 1/2023 | |

OTHER PUBLICATIONS

English machine translation of CN 114380995A. (Year: 2022).*
Li Chongzhi, Synthesis and performance study of new polycarboxylate Superplasticizer, Chinese Doctoral Dissertations & Master's Theses Full-text Database(Doctor) Engineering Science and Technology II, Jul. 15, 2005, pp. C038-20, Issue 3.
Zhiyun Yang et al., Synthesis and performance of an environmentally friendly polycarboxylate superplasticizer based on modifed poly(aspartic acid), Construction and Building Materials 202 154-161, Jan. 11, 2019.

* cited by examiner

*Primary Examiner* — John E Uselding
(74) *Attorney, Agent, or Firm* — Muncy, Geissler, Olds & Lowe, P.C.

(57) ABSTRACT

A solid polycarboxylate superplasticizer, preparation method, and use. A monohydroxyl/monoamino polyoxyethylene ether or derivative thereof and unsaturated benzenesulfonic acid small monomer having the effects of crack resistance, shrinkage reduction and catalysis are added to a reactor at one time by a one-pot process, mixed and stirred, followed by vacuum dehydration under heating conditions or an esterification reaction under the introduction of a protective gas. After the reaction is completed and cooled, slicing or milling is performed to obtain the solid polycarboxylate superplasticizer. The superplasticizer has crack resistance and shrinkage reduction while ensuring initial dispersion performance. An organic solvent is not used, and a green environmental protection effect is achieved. The esterification rate is high, reaction conditions are mild, energy consumption is low, and operation steps are simple. The superplasticizer is easy to slice or mill and convenient to realize industrial production, with a good market prospect.

8 Claims, No Drawings

SOLID POLYCARBOXYLATE SUPERPLASTICIZER AS WELL AS PREPARATION METHOD THEREFOR AND USE THEREOF

FIELD OF TECHNOLOGY

The present invention relates to the technical field of superplasticizers, and specifically relates to a solid polycarboxylate superplasticizer as well as a preparation method therefor and use thereof.

BACKGROUND

At present, most of polycarboxylate superplasticizer products sold on the market are liquids with a solid content within a range of 10-50%, which are higher in cost for long-distance construction, and meanwhile, also cause limitations of application fields. In a production process of building products, such as dry-mixed mortar, grouting materials, etc., it is necessary to select solid superplasticizers.

At present, preparation methods for solid polycarboxylate superplasticizers mainly include: (1) first polymerization and then drying, such as a spray drying method, wherein a spray curing process is complicated, and has high energy consumption, a high cost, and certain potential safety hazards; (2) a bulk polymerization method, wherein the bulk polymerization method has a higher temperature, temperature rise or temperature regulation during production at such temperature prolongs the production cycle, increases the production energy consumption, and increases the cost, and the phenomena of increase of the viscosity of a polymerization system and local implosion easily occur at a higher polymerization temperature; and (3) an esterification method, wherein polyethylene glycol monomethyl ether and polyacrylic acid undergo an esterification reaction under the action of a catalyst, such as concentrated sulfuric acid, p-toluenesulfonic acid, methanesulfonic acid, etc., a solid polycarboxylate superplasticizer can be obtained by slicing or milling after the reaction is completed, but the strong acid catalyst needs to be added in an esterification reaction process, and operation steps are complicated and have risks.

Fissures or cracks caused by drying shrinkage of concrete greatly increase the permeability of concrete, thereby aggravating the corrosion of steel bars and the freeze-thaw damage degree of concrete, and also accumulatively aggravating the damage degree of concrete, so as to cause serious damage to the durability of concrete, and then endanger the service life and safety of a structure. The polycarboxylate superplasticizers, due to the advantages of a high water reducing rate, green environmental protection, and a designable molecular structure, have become an indispensable part in the production of concrete, and have gradually become an important development direction of modern concrete superplasticizers.

According to a solid polycarboxylate superplasticizer and a preparation method therefor, with a publication No. CN111533852A, disclosed on Aug. 14, 2020, a non-reactive solutizer is used. However, introduction of the non-reactive solubilizer at an addition amount of only 0.6-2.2 parts can only reduce the viscosity of a system to a certain extent, and cannot fundamentally solve the problems of large viscosity, difficult heat dissipation, self-polymerization of acrylic acid and the like at a late stage of bulk polymerization. According to a solid slump retaining polycarboxylate superplasticizer and a preparation method therefor, with a publication No. CN107739424A, disclosed on Feb. 27, 2018, the addition of 1-8% of water as a solvent in a polymerization process can increase the solubility between reaction raw materials, thereby reducing the viscosity of a system in a reaction process and increasing the mass and heat transfer between the reaction raw materials. However, although the addition of 1-8% of water as a solvent can reduce the viscosity of the system to a certain extent, the introduction of water makes a finished product of the solid polycarboxylate superplasticizer easy to stick and cake and difficult to store.

According to a preparation method for a silica modified polyether and solid polycarboxylate superplasticizer, with a publication No. CN115368517A, disclosed on Nov. 22, 2022, a solid polycarboxylate superplasticizer and a preparation method therefor, with a publication No. CN111533852A, disclosed on Aug. 14, 2020, and a polycarboxylate superplasticizer with easy milling and high early strength and a preparation method therefor, with a publication No. CN115558062A, disclosed on Jan. 3, 2023, all the solid polycarboxylate superplasticizers are prepared by introducing silane into a molecular structure. Although the disadvantages of a low melting point and easy caking of conventional solid polycarboxylate superplasticizers are avoided to a certain extent, a preparation process is complicated, an organic solvent needs to be used, and reaction conditions are not mild, not green, and not environmentally friendly.

According to a solid corrosion retarding polycarboxylate superplasticizer and a preparation method therefor, with a publication No. CN114685799A, disclosed on Jul. 1, 2022, the superplasticizer is prepared by an esterification reaction of an olefin-maleic anhydride/itaconic anhydride alternating copolymer, a monohydroxyl/monoamino polyoxyethylene ether and a derivative thereof, a monohydroxyl organic amine compound having rust inhibition and corrosion retarding effects, and a strong acid catalyst. Although an organic solvent is not used, a reaction process is green and environmentally friendly, reaction conditions are mild, spray drying is not required, and energy consumption is low. However, the strong acid catalyst in an esterification reaction process needs to be added after the system is dehydrated, the operation has risks, and the method is not a real one-pot process, which is difficult to realize industrial mass production.

In the prior art, because all the main preparation methods for the solid polycarboxylate superplasticizers have certain problems, large-scale industrialization development of the solid polycarboxylate superplasticizers is not realized at present. Therefore, the development of a solid polycarboxylate superplasticizer which is green, environmentally friendly, easy to produce and convenient to industrialize, and has the functions of water reduction, crack resistance and shrinkage reduction has a quite broad application prospect.

SUMMARY

A purpose of the present invention is to provide a solid polycarboxylate superplasticizer and a preparation method therefor. An organic solvent is not used, a green environmental protection effect is achieved, a one-pot process is adopted, the esterification rate is high, reaction conditions are mild, operation steps are simple, and industrialization in a large scale is convenient to realize. The prepared solid superplasticizer has the effects of crack resistance and shrinkage reduction while ensuring initial dispersion performance, and is easy to slice or mill.

Another purpose of the present invention is to provide use of a solid polycarboxylate superplasticizer for concrete, which has better dispersion and dispersion retention performance.

Specific technical solutions of the present invention are as follows.

A solid polycarboxylate superplasticizer is provided. The solid polycarboxylate superplasticizer has a structure as follows:

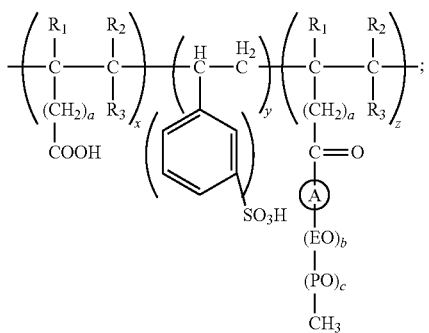

wherein $R_1$, $R_2$, and $R_3$ are selected from H, $CH_3$, COOH, or $CHCH_3CH_3$, and the $R_2$ and the $R_3$ are not COOH simultaneously; a is equal to 0 or 1; A is O or NH; b, c, x, y, and z are all integers, and b+c is equal to 22-105; and x+y+z is equal to 23-63.

The present invention provides a preparation method for a solid polycarboxylate superplasticizer, which includes the following steps:

(1) mixing an unsaturated acid small monomer, an unsaturated benzenesulfonic acid small monomer, an oxidizing agent, a reducing agent, and a chain transfer agent to carry out a redox free radical polymerization reaction to obtain a polycarboxyl polymer; and (2) mixing the polycarboxyl polymer with a monohydroxyl/monoamino polyoxyethylene ether or a derivative thereof to carry out a reaction, and after the reaction is completed and cooled, performing slicing or milling to obtain a solid polycarboxylate superplasticizer.

In step (1), a molar ratio of the unsaturated acid small monomer, the unsaturated benzenesulfonic acid small monomer, the oxidizing agent, the reducing agent, and the chain transfer agent is 1:(0.03-0.1):(0.03-0.2):(0.03-0.1):(0.01-0.05); and the unsaturated acid small monomer is at least one of acrylic acid, methacrylic acid, butenoic acid, 4-methyl-2-pentenoic acid, maleic acid, maleic anhydride, itaconic acid, or itaconic anhydride.

The unsaturated benzenesulfonic acid small monomer is an unsaturated benzenesulfonic acid small monomer having the effects of crack resistance, shrinkage reduction and catalysis, which is vinylbenzenesulfonic acid, preferably at least one of 2-vinylbenzenesulfonic acid, 3-vinylbenzenesulfonic acid, or 4-vinylbenzenesulfonic acid. The unsaturated benzenesulfonic acid small monomer adopted in the present invention achieves dual effects: in addition to introducing a benzene ring to achieve the effects of reducing surface tension and providing crack resistance and shrinkage reduction, it also provides a catalysis effect, which can be used as a catalyst for an esterification reaction in step (2). Meanwhile, the monomer has a simple structure, and can be purchased directly without synthesis. The vinylbenzenesulfonic acid is adopted in the present invention, and such unsaturated benzenesulfonic acid monomer has a polymerizable double bond, which can be directly polymerized to a main chain without adding an additional catalyst in the subsequent esterification reaction.

The oxidizing agent is at least one of hydrogen peroxide, ammonium persulfate, sodium persulfate, or potassium persulfate.

The reducing agent is at least one of sodium bisulfite, sodium sulfite, sodium formaldehyde sulfoxylate, ascorbic acid, sodium ascorbate, erythorbic acid, or sodium hypophosphate.

The chain transfer agent is at least one of mercaptoacetic acid, 2-mercaptopropionic acid, 3-mercaptopropionic acid, sodium methylallyl sulfonate, dodecanethiol, or sodium hypophosphite.

In step (1), the redox free radical polymerization reaction is carried out at 5-50° C., and a reaction time is 1-5 h;

in step (1), a molecular weight ($M_n$) of the polycarboxyl polymer is 3,000-8,000 g/mol; and in step (2), a molar ratio of the monohydroxyl/monoamino polyoxyethylene ether or the derivative thereof to the polycarboxyl polymer is (3-8): 1.

In step (2), a structure of the monohydroxyl/monoamino polyoxyethylene ether or the derivative thereof is:

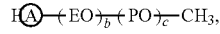

wherein A is O or NH; both b and c are an integer, and b+c is equal to 22-105; and EO represents —$CH_2$—$CH_2$—O—, and PO represents —$CH_2$—$CHCH_3$—O—.

In step (2), the reaction refers to vacuumizing or introducing a protective gas to carry out a reaction at 100-150° C. for 2-5 h;

in step (2), a molecular weight ($M_n$) of the solid polycarboxylate superplasticizer is 10,200-38,500 g/mol; and in step (2), the protective gas is at least one of nitrogen, argon, or helium.

The preparation method for a solid polycarboxylate superplasticizer provided by the present invention has an esterification rate of 93% or above.

The present invention provides use of a solid polycarboxylate superplasticizer, which is used for concrete.

By introducing an anti-cracking and shrinkage-reduction group into the structure of a polycarboxylate superplasticizer, a shrinkage-reduction polycarboxylate superplasticizer having a high water reducing rate and the effect of effectively reducing shrinkage of concrete is developed, so as to improve the volume stability of concrete and improve the structural durability of concrete, which has great significance for realizing a low-carbon plan of the construction industry and ensuring the safety of major national projects.

Compared with the prior art, the method of the present invention has the advantages that the unsaturated benzenesulfonic acid and the unsaturated acid capable of providing a catalysis effect for the esterification reaction are copolymerized and introduced into the molecular structure to avoid the addition of a strong acid catalyst in an esterification reaction process, meanwhile, the esterification rate is high, reaction conditions are mild, operation steps are simple, risks are reduced, a one-pot esterification process is realized in real sense, energy conservation and environmental protection are achieved, industrialization in a large scale is convenient to realize, and the method is in line with the low-carbon concept. The method of the present invention effectively avoids the problems of active end embedding, double bond destruction at a high temperature, a low conversion rate of a large monomer, serious self-polymerization of acrylic acid, etc., caused by high viscosity of the system and difficult heat dissipation when a solid polycarboxylate superplasticizer is prepared by conventional bulk polymerization. In addition, an organic solvent is not used, and a green environmental protection effect is achieved. The solid polycarboxylate superplasticizer prepared by the method of the present invention does not require spray drying. The molecular structure contains an anti-cracking and shrinking-reduction group, namely phenyl. The introduction of a benzene ring reduces the surface tension of a superplasticizer molecule, reduces the surface tension of a PCE solution, and can effectively reduce the volume shrinkage of concrete. Therefore, the present invention can effectively reduce the risk of cracking of concrete, increase the rigidity of the molecular structure, and reduce sticking and caking in a slicing or milling process, thereby improving the production efficiency and reducing energy consumption. The method of the present invention can adjust the molecular structure of a product by controlling the polymerization degree of the polycarboxyl polymer, the polymerization degree of monohydroxyl (amino) polyoxyethylene ether amber and a derivative thereof, and the molar ratio of raw materials, has strong designability, and provides sufficient electrostatic repulsion and steric hindrance to achieve excellent dispersion performance.

DESCRIPTION OF THE EMBODIMENTS

In order to make the purposes, technical solutions and advantages of the embodiments of the present invention clearer, the technical solutions in the embodiments of the present invention are described clearly and completely below in conjunction with the embodiments of the present invention. Obviously, the described embodiments are only a part of the embodiments of the present invention, rather than all of the embodiments. Based on the embodiments of the present invention, all other embodiments obtained by those of ordinary skill in the art without creative effort shall fall within the scope of protection of the present invention.

All test materials, reagents and the like used in the following embodiments, unless otherwise specified, are conventionally available.

Those without specific technologies or conditions in the embodiments are used according to technologies or conditions described in documents in the art or instructions of products.

Comparative Example 1

A preparation method for a solid polycarboxylate superplasticizer includes the following steps.

Step 1: 1 mol of acrylic acid, 0.1 mol of maleic anhydride, 0.12 mol of ammonium persulfate, 0.1 mol of ascorbic acid, and 0.02 mol of mercaptoethanol were used to carry out a redox free radical polymerization reaction at 25° C. for 4 h to obtain a polycarboxyl polymer ($M_n$=4,500 g/mol).

Step 2: 1 mol of the polycarboxyl polymer obtained in step 1 and 8 mol of monomethoxy polyethylene glycol ($M_n$=3,000 g/mol) were subjected to vacuum dehydration under heating and stirring conditions. When the temperature of the system reached 130° C., 0.05 mol of concentrated sulfuric acid was added, and continued vacuumizing was performed to carry out a reaction for 5 h. After the reaction was completed and cooled, a sample was taken for GPC detection, which had an esterification rate of 89%. Then, slicing or milling was performed to obtain a solid polycarboxylate superplasticizer with a molecular weight ($M_n$) of 285,000 g/mol.

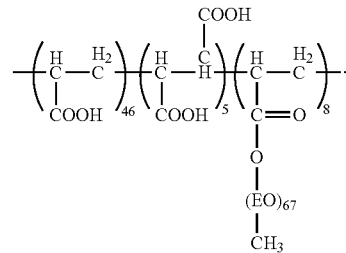

Example 1

A preparation method for a solid polycarboxylate superplasticizer includes the following steps.

Step 1: 1 mol of itaconic acid, 0.03 mol of 2-vinylbenzenesulfonic acid, 0.04 mol of hydrogen peroxide, 0.1 mol of sodium bisulfite, and 0.01 mol of mercaptoacetic acid were used to carry out a redox free radical polymerization reaction at 20° C. for 2.5 h to obtain a polycarboxyl polymer ($M_n$=3,000 g/mol, a=1).

Step 2: 1 mol of the polycarboxyl polymer obtained in step 1 and 3 mol of a monoamino EO-PO random copolymer ($M_n$=2,400 g/mol, b=30, c=18) were used to carry out a reaction in a reactor at 100° C. for 5 h under the introduction of argon as a protective gas. After the reaction was completed and cooled, a sample was taken for GPC detection, which had an esterification rate of 96%. Then, slicing or milling was performed to obtain a solid polycarboxylate superplasticizer with a molecular weight ($M_n$) of 10,200 g/mol.

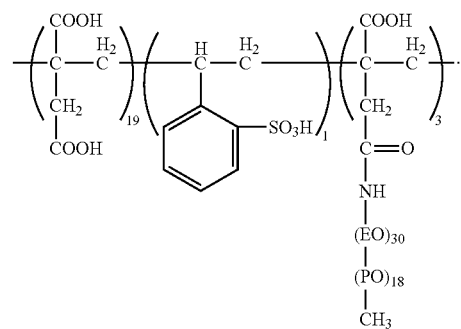

Example 2

A preparation method for a solid polycarboxylate superplasticizer includes the following steps.

Step 1: 1 mol of acrylic acid, 0.04 mol of 3-vinylbenzenesulfonic acid, 0.03 mol of ammonium persulfate, 0.1 mol of sodium sulfite, and 0.02 mol of 2-mercaptopropionic acid were used to carry out a redox free radical polymerization reaction at 30° C. for 3 h to obtain a polycarboxyl polymer ($M_n$=3,500 g/mol, a=1).

Step 2: 1 mol of the polycarboxyl polymer obtained in step 1 and 7 mol of a monohydroxyl EO-PO random copolymer ($M_n$=5,000 g/mol, b=83, c=22) were used to carry out a reaction in a reactor at 110° C. for 4.5 h under the introduction of nitrogen as a protective gas. After the reaction was completed and cooled, a sample was taken for GPC detection, which had an esterification rate of 93%. Then, slicing or milling was performed to obtain a solid polycarboxylate superplasticizer with a molecular weight ($M_n$) of 38,500 g/mol.

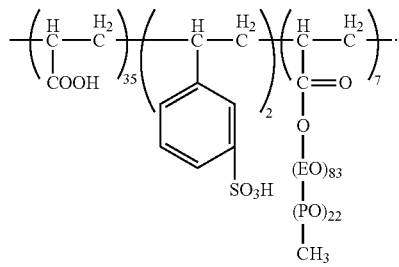

Example 3

A preparation method for a solid polycarboxylate superplasticizer includes the following steps.

Step 1: 1 mol of methacrylic acid, 0.05 mol of 4-vinylbenzenesulfonic acid, 0.08 mol of sodium persulfate, 0.1 mol of sodium formaldehyde sulfoxylate, and 0.05 mol of 3-mercaptopropionic acid were used to carry out a redox free radical polymerization reaction at 45° C. for 2 h to obtain a polycarboxyl polymer ($M_n$=4,000 g/mol, a=0).

Step 2: 1 mol of the polycarboxyl polymer obtained in step 1 and 6 mol of a monohydroxyl EO-PO random copolymer ($M_n$-4,600 g/mol, b=90, c=10) were used to carry out a reaction in a reactor at 120° C. for 4 h under the introduction of helium as a protective gas. After the reaction was completed and cooled, a sample was taken for GPC detection, which had an esterification rate of 93%. Then, slicing or milling was performed to obtain a solid polycarboxylate superplasticizer with a molecular weight ($M_n$) of 31,600 g/mol.

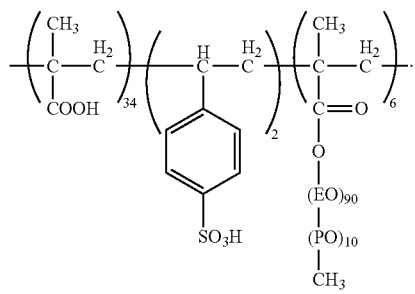

Example 4

A preparation method for a solid polycarboxylate superplasticizer includes the following steps.

Step 1: 1 mol of maleic acid, 0.04 mol of 3-vinylbenzenesulfonic acid, 0.2 mol of potassium persulfate, 0.1 mol of ascorbic acid, and 0.04 mol of sodium methylallyl sulfonate were used to carry out a redox free radical polymerization reaction at 50° C. for 1.5 h to obtain a polycarboxyl polymer ($M_n$=3,000 g/mol, a=0).

Step 2: 1 mol of the polycarboxyl polymer obtained in step 1 and 8 mol of monomethoxy polyethylene glycol ($M_n$=1,000 g/mol, b=22, c=0) were used to carry out a reaction at 130° C. for 3 h under vacuumizing. After the reaction was completed and cooled, a sample was taken for GPC detection, which had an esterification rate of 97%. Then, slicing or milling was performed to obtain a solid polycarboxylate superplasticizer with a molecular weight ($M_n$) of 11,000 g/mol.

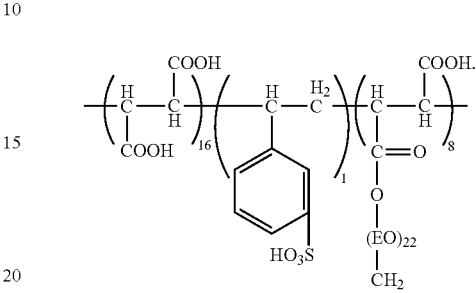

Example 5

A preparation method for a solid polycarboxylate superplasticizer includes the following steps.

Step 1: 1 mol of maleic anhydride, 0.05 mol of 2-vinylbenzenesulfonic acid, 0.15 mol of ammonium persulfate, 0.1 mol of sodium ascorbate, and 0.03 mol of dodecanethiol were used to carry out a redox free radical polymerization reaction at 5° C. for 1 h to obtain a polycarboxyl polymer ($M_n$=5,000 g/mol, a=0).

Step 2: 1 mol of the polycarboxyl polymer obtained in step 1 and 4 mol of monomethoxy polyethylene glycol ($M_n$=3,000 g/mol, b=67, c=0) were used to carry out a reaction at 150° C. for 2 h under vacuumizing. After the reaction was completed and cooled, a sample was taken for GPC detection, which had an esterification rate of 95%. Then, slicing or milling was performed to obtain a solid polycarboxylate superplasticizer with a molecular weight ($M_n$) of 17,000 g/mol.

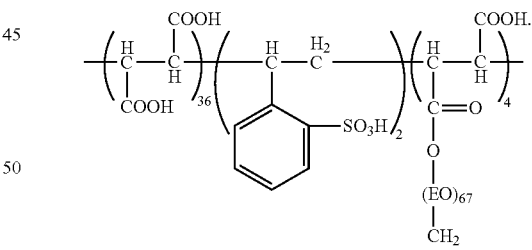

Example 6

A preparation method for a solid polycarboxylate superplasticizer includes the following steps.

Step 1: 1 mol of itaconic anhydride, 0.05 mol of 4-vinylbenzenesulfonic acid, 0.2 mol of hydrogen peroxide, 0.05 mol of erythorbic acid, and 0.05 mol of sodium hypophosphite were used to carry out a redox free radical polymerization reaction at 10° C. for 3 h to obtain a polycarboxyl polymer ($M_n$=8,000 g/mol, a=1).

Step 2: 1 mol of the polycarboxyl polymer obtained in step 1 and 3 mol of monomethoxy polyethylene glycol ($M_n$=2,000 g/mol, b=44, c=0) were used to carry out a reaction at 140° C. for 3 h under vacuumizing. After the reaction was completed and cooled, a sample was taken for GPC detection, which had an esterification rate of 96%. Then, slicing or milling was performed to obtain a solid polycarboxylate superplasticizer with a molecular weight ($M_n$) of 14,000 g/mol.

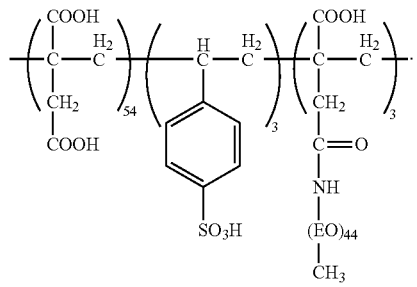

Example 7

A preparation method for a solid polycarboxylate superplasticizer includes the following steps.

Step 1: 1 mol of butenoic acid, 0.1 mol of 4-vinylbenzenesulfonic acid, 0.1 mol of ammonium persulfate, 0.04 mol of erythorbic acid, and 0.05 mol of 3-mercaptopropionic acid were used to carry out a redox free radical polymerization reaction at 10° C. for 3.5 h to obtain a polycarboxyl polymer ($M_n$=6,000 g/mol, a=0).

Step 2: 1 mol of the polycarboxyl polymer obtained in step 1 and 4 mol of monomethoxy polyethylene glycol ($M_n$=3,000 g/mol, b=67, c=0) were used to carry out a reaction at 120° C. for 4 h under vacuumizing. After the reaction was completed and cooled, slicing or milling was performed, and a sample was taken for GPC detection, which had an esterification rate of 94%. Then, a solid polycarboxylate superplasticizer with a molecular weight ($M_n$) of 18,000 g/mol was obtained.

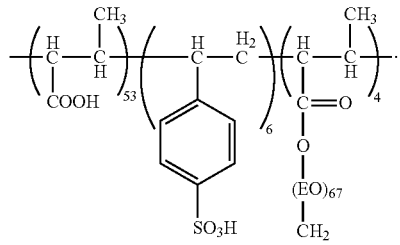

Example 8

A preparation method for a solid polycarboxylate superplasticizer includes the following steps.

Step 1: 1 mol of 4-methyl-2-pentenoic acid, 0.1 mol of 4-vinylbenzenesulfonic acid, 0.1 mol of ammonium persulfate, 0.04 mol of erythorbic acid, and 0.05 mol of 3-mercaptopropionic acid were used to carry out a redox free radical polymerization reaction at 10° C. for 4 h to obtain a polycarboxyl polymer ($M_n$=3,000 g/mol, a=0).

Step 2: 1 mol of the polycarboxyl polymer obtained in step 1 and 8 mol of monomethoxy polyethylene glycol ($M_n$=3,000 g/mol, b=67, c=0) were used to carry out a reaction at 130° C. for 4.5 h under vacuumizing. After the reaction was completed and cooled, a sample was taken for GPC detection, which had an esterification rate of 95%. Then, slicing or milling was performed to obtain a solid polycarboxylate superplasticizer with a molecular weight ($M_n$) of 25,000 g/mol.

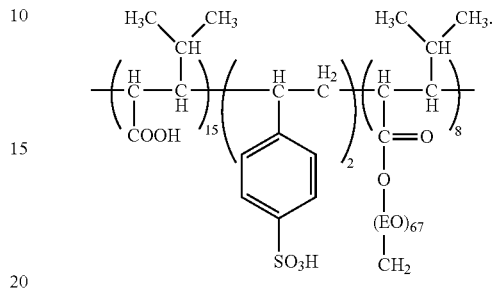

Physical and chemical property test of the solid polycarboxylate superplasticizers prepared in the above examples and comparative example: With reference to the standard of China Building Materials Association "High Performance Superplasticizers of Solid Polycarboxylates", the appearance, ash content, moisture content, fineness and bulk density of the samples obtained in Example 1 to Example 8 and Comparative Example 1 were tested. Results are shown in Table 1.

TABLE 1

Physical and chemical properties of solid polycarboxylate superplasticizers prepared in various examples and comparative example

| Sample | Appearance | Ash content/% | Moisture content/% | Fineness (0.315 mm sieve residue)/% | Bulk density/ (g/cm³) |
|---|---|---|---|---|---|
| Comparative Example 1 | Uniform color and slight caking | 0.47 | 0.88 | 2.73 | 0.58 |
| Example 1 | Uniform color and no caking | 0.43 | 0.47 | 1.54 | 0.62 |
| Example 2 | Uniform color and no caking | 0.39 | 0.52 | 1.73 | 0.61 |
| Example 3 | Uniform color and no caking | 0.38 | 0.41 | 1.19 | 0.64 |
| Example 4 | Uniform color and no caking | 0.47 | 0.28 | 1.67 | 0.62 |
| Example 5 | Uniform color and no caking | 0.46 | 0.69 | 2.05 | 0.60 |
| Example 6 | Uniform color and no caking | 0.41 | 0.57 | 1.76 | 0.61 |
| Example 7 | Uniform color and no caking | 0.37 | 0.43 | 1.85 | 0.61 |
| Example 8 | Uniform color and no caking | 0.40 | 0.71 | 2.11 | 0.60 |

With reference to the GB/T 8077-2012 "Methods for Testing Uniformity of Concrete Admixtures", a paste fluidity test was carried out on the samples obtained in Comparative Example 1 and Example 1 to Example 8. A waterbinder ratio was 0.29, and a doping amount of a superplasticizer was a solid doping amount of a cementing material. Results are shown in Table 2. As can be seen, compared with Comparative Example 1, the samples prepared by the method in Example 1 to Example 8 have better dispersion and dispersion retention performance.

TABLE 2

Paste fluidity and gradual loss of different samples in examples and comparative example

| Sample | Doping amount | Paste fluidity/mm | |
|---|---|---|---|
| | | 0 h | 1 h |
| Comparative Example 1 | 0.15% | 225 | 185 |
| Example 1 | | 226 | 189 |
| Example 2 | | 228 | 187 |
| Example 3 | | 236 | 197 |
| Example 4 | | 225 | 185 |
| Example 5 | | 229 | 189 |
| Example 6 | | 227 | 193 |
| Example 7 | | 227 | 196 |
| Example 8 | | 236 | 190 |

Concrete performance test: With reference to the GB8076-2008 "Concrete Admixtures", the slump loss, concrete strength and 28 d shrinkage ratio of the samples obtained in Comparative Example 1 and Example 1 to Example 8 were tested. Results are shown in Table 3. When a solid doping amount of an admixture is 1.0 wt % (relative to a use amount of cement), the 28 d shrinkage ratio in various examples is significantly reduced compared with that in Comparative Example 1.

TABLE 3

Concrete slump retaining performance and early mechanical performance of different samples

| Sample | Doping amount | Slump (mm)/ slump flow (mm) | | Compressive strength/ MPa | | | 28 d Shrink- age ratio |
|---|---|---|---|---|---|---|---|
| | | 0 h | 1 h | 3 d | 7 d | 28 d | |
| Comparative Example 1 | 0.2% | 210/560 | 185/460 | 27.4 | 33.7 | 46.8 | 63 |
| Example 1 | | 215/565 | 190/485 | 28.6 | 36.8 | 47.7 | 40 |
| Example 2 | | 215/570 | 195/495 | 29.5 | 36.3 | 48.3 | 39 |
| Example 3 | | 215/585 | 210/475 | 28.6 | 35.4 | 47.6 | 43 |
| Example 4 | | 225/560 | 200/465 | 29.4 | 34.5 | 48.6 | 36 |
| Example 5 | | 215/565 | 210/495 | 29.5 | 33.8 | 48.4 | 39 |
| Example 6 | | 220/580 | 205/495 | 28.3 | 33.9 | 48.5 | 41 |
| Example 7 | | 220/560 | 215/485 | 27.1 | 34.9 | 48.6 | 43 |
| Example 8 | | 230/570 | 210/490 | 26.1 | 35.6 | 47.9 | 45 |

In Comparative Example 1, a strong acid catalyst, such as concentrated sulfuric acid, needs to be added to catalyze an esterification reaction after dehydration is completed. Without stirring in time, the catalyst is not immediately dispersed evenly in the system, leading to carbonization and other side reactions and affecting the final performance. Meanwhile, an addition process also has potential safety hazards.

The products prepared in various examples of the present invention have a significantly reduced 28 d shrinkage ratio and an anti-cracking effect. In addition, the esterification rate in the examples is obviously improved, indicating that the unsaturated benzenesulfonic acid small monomer used in the present invention has a catalysis effect. It can also be seen by comparison that the products prepared in the examples of the present invention have better milling performance and less sticking and caking.

The description of the examples above is intended to facilitate the understanding and application of the present invention by those of ordinary skill in the art. It is obvious to persons familiar with the art that various modifications to these examples can be easily made, and general principles described herein can be applied to other examples without creative effort. Therefore, the present invention is not limited to the above examples, and all improvements and modifications made by those skilled in the art based on the disclosure of the present invention without departing from the scope of the present invention shall fall within the scope of protection of the present invention.

What is claimed is:

1. A preparation method for a solid polycarboxylate superplasticizer, comprising the following steps:
   (1) mixing an unsaturated acid monomer, an unsaturated benzenesulfonic acid monomer, an oxidizing agent, a reducing agent, and a chain transfer agent to carry out a redox free radical polymerization reaction to obtain a polycarboxyl polymer; and
   (2) mixing the polycarboxyl polymer with a monohydroxyl/monoamino polyoxyethylene ether to carry out a reaction, and after the reaction is completed and cooled, performing slicing or milling to obtain a solid polycarboxylate superplasticizer;
   the solid polycarboxylate superplasticizer has a structure as follows:

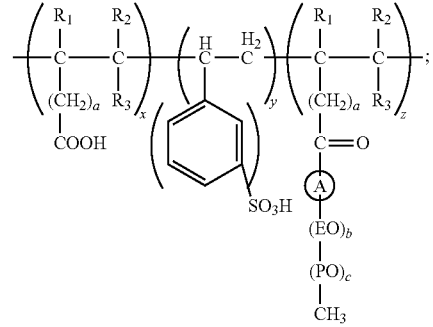

wherein $R_1$, $R_2$, and $R_3$ are selected from H, $CH_3$, COOH, or $CHCH_3CH_3$, and the $R_2$ and the $R_3$ are not COOH simultaneously; a is equal to 0 or 1; A is O or NH; b and c are integers; x, y, and z are positive integers, and b+c is equal to 22-105; and x+y+z is equal to 23-63.

2. The preparation method according to claim 1, wherein in step (1), a molar ratio of the unsaturated acid monomer, the unsaturated benzenesulfonic acid monomer, the oxidizing agent, the reducing agent, and the chain transfer agent is 1:(0.03-0.1):(0.03-0.2):(0.03-0.1):(0.01-0.05).

3. The preparation method according to claim 1, wherein in step (1), the unsaturated benzenesulfonic acid monomer is vinylbenzenesulfonic acid.

4. The preparation method according to claim 1, wherein in step (1), the unsaturated acid monomer is at least one of acrylic acid, methacrylic acid, butenoic acid, 4-methyl-2-pentenoic acid, maleic acid, maleic anhydride, itaconic acid, or itaconic anhydride.

5. The preparation method according to claim 1, wherein in step (1), the redox free radical polymerization reaction is carried out at 5-50° C., and a reaction time is 1-5 h.

6. The preparation method according to claim 1, wherein in step (2), a molar ratio of the monohydroxyl/monoamino polyoxyethylene ether to the polycarboxyl polymer is (3-8): 1; a structure of the monohydroxyl/monoamino polyoxyethylene ether is:

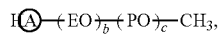

wherein A is O or NH; and both b and c are an integer, and b+c is equal to 22-105.

7. The preparation method according to claim 1, wherein in step (2), the reaction refers to vacuumizing or introducing a protective gas to carry out a reaction at 100-150° C. for 2-5 h.

8. The preparation method according to claim 1, wherein in step (2), a molecular weight ($M_n$) of the solid polycarboxylate superplasticizer is 10,200-38,500 g/mol.

* * * * *